March 1, 1966 N. W. SCHUBRING ETAL 3,238,396
HEAT MOTOR WITH A DIELECTRIC ROTOR
Filed May 13, 1963

INVENTOR.
Norman W. Schubring,
BY & James P. Nolta
Paul J. Ethington
ATTORNEY

United States Patent Office 3,238,396
Patented Mar. 1, 1966

3,238,396
HEAT MOTOR WITH A DIELECTRIC ROTOR
Norman W. Schubring, Birmingham, and James P. Nolta, Detroit, Mich., assignors to General Motors Corporation, Detroit, Mich., a corporation of Delaware
Filed May 13, 1963, Ser. No. 279,892
6 Claims. (Cl. 310—4)

This invention relates to the conversion of thermal energy into mechanical energy and, more particularly, to a motor in which rotation of a dielectric element is produced by applying thermal energy to a portion of the element.

In accordance with the invention, a dielectric element is caused to be displaced by the local application of heat to the element. In general, this is accomplished by applying a voltage gradient uniformly across the element by suitable electrode means such that the dielectric element, in theory, approximates a substantially continuous stretch of parallel connected and charged capacitors. Means are provided for applying heat to a relatively small portion of the dielectric element thereby to cause a change in the capacitance of the element at the point the heat is applied due to effects described below. This local change of capacitance produces a corresponding voltage change at the heated point which results in a displacement or redistribution current. Magnetic means are provided to produce a magnetic field across the heated portion of the element and at right angles to the direction of the voltage gradient across the element. The flow of redistribution current through the field produces a torque tending to displace the heated portion of the element away from the heat source.

To further describe the effect of heating the dielectric element, it is to be first noted that the permittivity or dielectric constant, as it is popularly known, of many dielectric materials is not a constant at all but is subject to variations with temperature. These variations are particularly marked in the vicinity of a Curie temperature of the particular dielectric material. The Curie temperature is that temperature at which permittivity is a relative maximum and from which permittivity decreases rapidly with either increasing or decreasing temperature. The Curie point of a particular material may vary from room temperature, as for example, with antimony-sulfur-iodine (SbSI) to higher temperatures of approximately 210° F. in the case of barium-titanate. These examples are not intended to define a range of possible temperatures, but merely illustrate that varation is possible. Thus, a capacitive element of a temperature sensitive dielectric material may be maintained at some equilibrium temperature from which any change produces a rapid change in permittivity. For the best example, assume that the dielectric material is maintained at a Curie temperature, with the result being that an increase in the temperature of the dielectric material produces a decrease in permittivity. Thus, if the capacitor is charged to a voltage V by a D.C. source connected thereacross and the element is then subjected to an increase in temperature, the permittivity will decrease markedly. This decrease in permittivity causes a proportional decrease in the capacitance of the element. From the well known relation $Q=CV$, it can be seen that a decrease in the capacitance is accompanied by an increase in the voltage V since the charge Q must remain constant. Since the element is then charged to a higher potential than the source, current must flow to the source.

In the case of a substantially continuous element of dielectric material as in the brief description of invention above, the localized application of heat to a relatively small portion of the element has the effect of decreasing the permittivity and, thus, the capacitance of a theoretically closely grouped number of parallel connected capacitors. Thus, the voltage across the temperature-affected capacitors increases. Since this voltage increase produces an astable condition wherein one of many parallel connected capacitors has a greater voltage across it than the others, which voltage is also greater than that of the charging source, a redistribution of voltage must occur. This redistribution produces a relative current flow through the heated portion of the element. This current flows back to the source, restoring energy to it such that substantially no net power is required of the source. As indicated above, the heat source is placed in the vicinity of a magnetic field producing means which sets up a field transverse to the direction of electric potential. As is well known, the flow of current through a conductor subjected to a transverse magnetic field produces a torque in that element. Thus, the dielectric element is displaced past the source of heat. Each relatively cool portion of the dielectric element entering the area of the heat source continues the flow of redistribution current and, thus, maintains a continuous displacement of the element.

The invention may be best understood upon reference to the following description of a preferred embodiment of the invention employing an annular dielectric element. This description is to be taken with the accompanying drawings of which:

Figure 1:
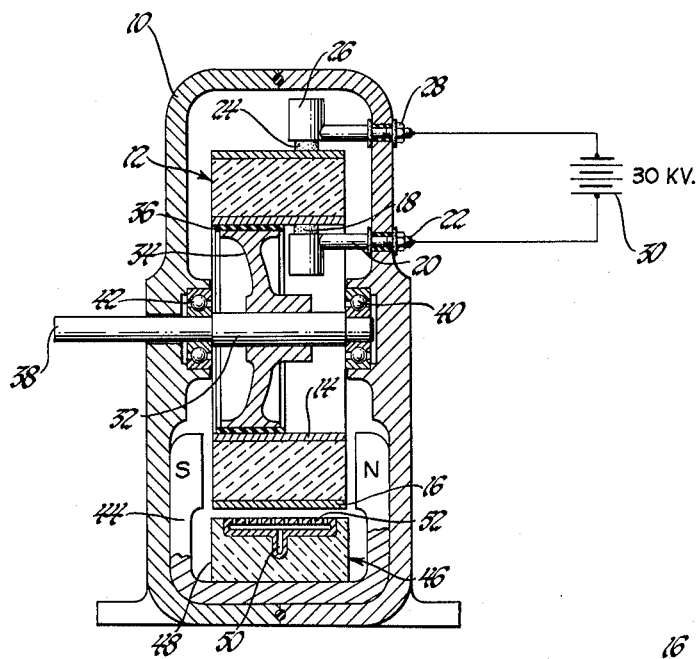
FIGURE 1 is a cross-sectional view of a heat motor employing the present invention.

Referring now to FIGURE 1, the illustrative heat motor is provided with a suitable housing 10 which may be split into two sections as indicated to afford access to the interior portions of the motor. The internal structure comprises an annular rotor 12 of dielectric material such as barium-titanate which exhibits the temperature sensitivity indicated in FIGURE 3. Suitably mounted on the inner and outer surfaces of the annular element 12 are flat annular electrode rings 14 and 16 respectively. In contact with the inner electrode ring 14 is a brush 18 and a suitable brush holder 20 which is fastened to the housing 10 by means of the conductive arrangement indicated at 22. A second brush 24 is maintained in contact with the outer electrode ring 16 by means of brush holder 26 which is also fastened to the housing 10 as indicated at 28. To apply a potential gradient across the annular dielectric element 12 from the inner to the outer surface thereof, a D.C. source 30 of high voltage is connected through the conductive fasteners 22 and 28 to the brushes 18 and 24 respectively. The source 30 may, depending upon the particular specifications of the motor components, provide a voltage in the vicinity of 30 kv. which is effective to charge the theoretically parallel connected array of capacitors between the electrode rings 14 and 16 to a voltage substantially equal to that of the source 30.

The rotor 12 is adapted for angular displacement about an axle 32 by means of a plurality of rigid spokes 34 which are insulated from the inner ring 14 by means of an insulative band 36. The axle 32 is interconnected with an output shaft 38 and the combination thereof is mounted in the housing 10 by means of bearings 40 and 42.

The internal structure of the heat motor shown in FIGURE 1 also includes a permanent magnet 44 having north and south poles as shown located on opposite lateral sides of the rotor 12. In this configuration the magnet 44 is effective to produce a strong and substantially uniform magnetic field directly across and through the particular portion of the dielectric rotor 12 which is between the pole pieces.

The internal structure also includes a heat source generally indicated at 46. The purpose of the source 46 is to apply heat to a concentrated area of the rotor 12 between the poles of magnet 44. The source 46 may take a variety of forms, although in the present case it is shown to include a ceramic block 48 having formed in the upper portion thereof a gas inlet 50 which communicates with a burner surface 52 which is approximately as wide as the rotor 12. The burner surface comprises a flat section of heat proof material having a plurality of apertures linearly formed therein. In accordance with the invention, this gas heat source 46 may be suitably ignited to provide highly localized heating of the portion of the rotor 12 which is directly above the burner surface.

Figure 2:
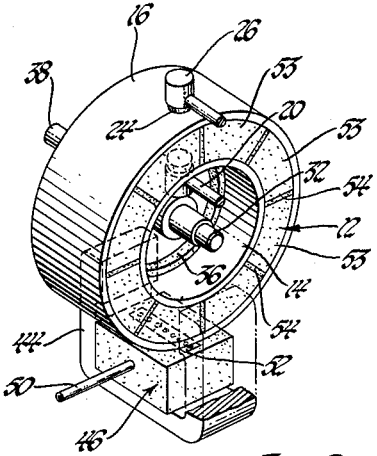
FIGURE 2 is an isometric view of the internal structure of the heat motor shown in FIGURE 1.

Referring now to FIGURE 2, the construction of the internal components of the motor are shown in greater detail. In this view it is indicated that the rotor 12 may be constructed of a plurality of arcuate sections 53 which are thermally insulated from one another by somewhat resilient material indicated at 54. This sectional construction has the advantage of providing some leeway for thermal expansion upon heating of the element 12.

Figure 3:
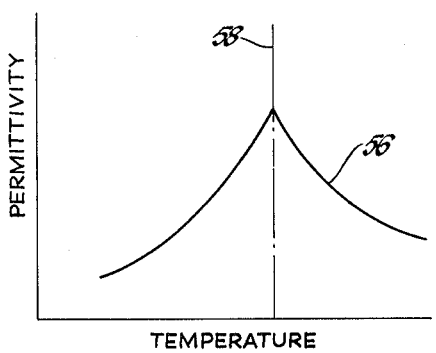
FIGURE 3 is a plot of permittivity versus temperature for a material which is suitable for use in the present invention.

In the description of operation for the heat motor shown in FIGURES 1 and 2, it is assumed that the rotor 12 is made from a material which is selected to exhibit a permittivity-temperature curve such as that shown in FIGURE 3. In FIGURE 3 it can be seen that the curve 56 has a relative peak at a particular temperature designated at 58. The temperature 58 may be called a Curie temperature and deviation from this temperature, either increasingly or decreasingly, is effective to produce a rapid decrease in the permittivity of the dielectric material. The material for the rotor 12 is best chosen such that the Curie temperature 58 occurs at a fairly high temperature inasmuch as the temperature of the rotor 12 tends to stabilize at a higher than room temperature due to retention of heat from source 46. The application of the source 30 across the electrode rings 14 and 16 produces the potential gradient across the rotor 12 from the inner to the outer surface thereof. This voltage gradient exists uniformly around the rotor 12 except, of course, where interrupted by the resilient insulating material 54 shown in FIGURE 2, which is an optional construction. Upon igniting the burners of the heat source 46, the lowermost portion of the rotor 12 will be heated to a temperature which exceeds the remaining portions of the rotor. Accordingly, the permittivity and the capacitance of the heated portion of the rotor 12 adjacent the burners decreases relative to the remainder of the rotor. With the effective capacitance between the electrode rings 14 and 16 in the lowermost portion of the rotor 12 being substantially lower than the remaining cooler portions of the rotor, it follows from the preliminary discussion that the voltage across the heated portion of the rotor 12 exceeds the voltage gradient between the ring electrodes 14 and 16 at all other points. Similarly, the potential across the electrodes exceeds that of the source 30. Accordingly, the condition of excessive voltage across the heated portion of the rotor 12 may not exist but will readjust by the flow of redistribution current. Therefore, there is a current flow from the outer ring 16 to the inner ring 14 in the heated portion of the rotor. As seen in FIGURES 2 and 3, this redistribution current is transverse to the magnetic field which exists between the north and south poles of the magnet 44. Following the well established principles of dynamoelectrics, torque is produced by this redistribution current flow which tends to move the current-carrying portion of the rotor out of the magnetic field between the poles of magnet 44. Therefore, the rotor 12 is angularly displaced about the axle 32. Rotation of the rotor 12 brings a cooler portion into the vicinity of the heat source 46, the permittivity of which is decreased by heating as suggested in the curve of FIGURE 3. Further redistribution current is produced causing the rotor 12 to rotate continuously past the burners of source 46, successively heating and cooling the various portions of the rotor 12.

It is to be understood that the invention has been described with reference to a particular embodiment thereof and its various modifications and equivalent substitutions may be made in the elements of the embodiment described herein without departing from the scope and spirit of the invention. For a definition of the invention, reference should be had to the appended claims.

What is claimed is:

1. Apparatus for converting thermal energy into mechanical energy comprising: a displaceably mounted rotor of dielectric material; a source of electrical energy; means for connecting the source across the rotor thereby to uniformly charge the dielectric material to a predetermined voltage; a source of thermal energy positioned to heat a relatively small portion of the rotor thereby to cause a voltage increase locally across said portion; means to apply a magnetic field across said portion of the rotor transverse to the direction of the voltage whereby current flow across the rotor resulting from said voltage increase produces a torque tending to angularly displace the rotor.

2. Apparatus for converting thermal energy into mechanical energy comprising: a substantially continuous element of dielectric material, the element being adapted for continuous displacement; means for applying a predetermined voltage uniformly across the element; means for applying heat to a relatively small portion of the element thereby to cause a voltage increase locally across the heated portion; means to produce a magnetic field across the portion transverse to the direction of the voltage across the element, whereby current flow across the element resulting from a local voltage increase produces a torque tending to displace the element.

3. Apparatus for converting heat into mechanical motion comprising: an annular rotor of dielectric material, the rotor being mounted for angular displacement; continuous electrode means mounted on the inner and outer surfaces of the rotor; a source of electrical potential; means to apply the source across the electrode means to produce a voltage uniformly across the rotor; a source of heat being positioned in proximity to the rotor to heat a relatively small portion thereof to produce a voltage increase locally across the heated portion; means to produce a magnetic field across the heated portion of the rotor transverse to the direction of the voltage thereacross whereby current flow across the element resulting from a local voltage increase produces a torque tending to displace the heated portion away from the source of heat.

4. Apparatus as described in claim 3 wherein the annular rotor is composed of a plurality of arcuate segments which are thermally insulated from one another.

5. Apparatus for converting thermal energy into mechanical energy comprising: an annular rotor of dielectric material, the material being selected to exhibit a sloping temperature-permittivity curve; electrode means mounted on the inner and outer surfaces of the rotor, a source of potential connected across the electrode means to produce a potential gradient across the rotor; means to apply heat to a relatively small portion of the rotor to raise the temperature of the portion higher than the remainder of the rotor thereby to produce a voltage increase locally across the heated portion; and means to produce a magnetic field across the heated portion of the rotor transverse to the direction of the potential gradient whereby current flow across the element resulting from a low voltage increase produces a torque tending to displace the heated portion away from the source of heat.

6. A method for converting thermal energy into mechanical energy comprising the steps of: applying a potential gradient uniformly across a heat-sensitive dielectric element; heating a small portion of the dielectric element thereby to increase the potential gradient across the element locally about the heated portion; and applying a magnetic field across the heated portion perpendicular to the potential gradient whereby current flow across the heated portion of the element resulting from a local voltage change produces a torque tending to displace the element.

No references cited.

ORIS L. RADER, *Primary Examiner.*